3,064,007
PROCESS FOR THE PRODUCTION OF
ISONITRONES
Heinrich Krimm, Krefeld-Bockum, and Hermann Schnell, Krefeld-Uerdingen, Germany, assignors to Farbenfabriken Bayer Aktiengesellschaft, Leverkusen, Germany, a corporation of Germany
No Drawing. Filed Nov. 26, 1958, Ser. No. 776,404
Claims priority, application Germany Dec. 2, 1957
2 Claims. (Cl. 260—333)

This invention relates to a process for the production of isonitrones.

It is known to produce isonitrones, which are valuable compounds for the production of other organic compounds, for instance, of N-substituted carboxylic acid amides, by treating Schiff's bases, which are obtainable in known manner, for example, by condensation of primary amines with oxo compounds, or mixtures of primary amines and oxo compounds, optionally with the simultaneous use of an inert solvent, with peroxy compounds, preferably at temperatures below 50° C. and in particular at temperatures between about −10 and +20° C. (German Patents No. 952,895; 959,094; and 943,228 and British Patent No. 743,940).

As peroxy compounds, there are used hydrogen peroxide, Caro's acid or organic peracids such as performic acid, peracetic acid, perpropionic acid, perbutyric acid, perbenzoic acid, monoperphthalic acid or perfuric acid.

We have now found that for the production of such isonitrones by the reaction of Schiff's bases or of mixtures of primary amines and oxo compounds with peroxy compounds, there can be used with a special advantage as peroxy compounds the compounds containing active oxygen obtained by the oxidation of aldehydes with molecular oxygen, the constitution of which corresponds to that of aldehyde-monoperacylates.

Thus, whereas in the known processes peroxy compounds are used as starting materials which are derived from hydrogen peroxide, in comparison therewith in the new process, atmospheric oxygen is the ultimate source of the oxygen.

As in the case of the known processes, suitable Schiff's bases for the present process are, for example, the condensation products of aldehydes, such as formaldehyde, acetaldehyde, propionaldehyde, n-butyraldehyde, isobutyraldehyde, isovaleraldehyde, oenanthaldehyde, palmitaldehyde, glycolaldehyde, succindialdehyde, cyclohexylformaldehyde, phenylacetaldehyde, benzaldehyde, o-, m- and p-chlorobenzaldehyde, o-, m- and p-nitrobenzaldehyde, o-, m- and p-toluylaldehyde, α- and β-naphthaldehyde, furfural (2-furaldehyde) and phenylglyoxal or of ketones, such as acetone, methyl ethyl ketone, methyl propyl ketone, diethyl ketone, methyl heptyl ketone, laevulinic acid ethyl ester, pinacolin (3,3-dimethyl-2-butanone), diacetyl, acetylacetone, acetonylacetone, acetophenone, o-, m- and p-chloroacetophenone, benzaphenone, cyclopentanone, cyclohexanone, 1-methylcyclohexane-2-one, 1-cyclohexylcyclohexane-2-one, 1-nitrocyclohexane-2-one, cyclohexane-1,4-dione, acetyl cyclohexanone, muscone, camphor, menthone, α-hydrindone, 1-oxo-tetrahydronaphthalene, 1-oxo-decahydronaphthalene, anthrone, fluorenone, 2-acetylthiophene, 2-acetyl furan, xanthone (9-xanthenone) and anthraquinon, or of ketoaldehydes, such as laevulin aldehyde, methyl glyoxal and phenyl glyoxal, with ammonia or with a compound containing a primary amino group, such as methylamine, ethylamine, isopropylamine, n-butylamine, sec.-butylamine, tert.-butylamine, isobutylamine, isoamylamine, dodecylamine, stearylamine, ethylene diamine, hexamethylene diamine, aminoethalol, glycocoll (glycine), alanine, ω-aminocapronic acid, cyclopentylamine, cyclohexylamine, 2-methylcyclohexylamine, 4-methylcyclohexylamine, hexahydrobenzylamine, bornylamine, benzylamine, o-, m- and p-nitrobenzylamine, o-, m- and p-chlorobenzylamine, α- or β-phenylethylamine, benzhydrylamine, aniline, o-, m- and p-toluidine, p-xylidine, mesidine (2,4,6-trimethylaniline), o-, m- and p-chloraniline, o-, m- and p-nitroaniline, aminobenzyl alcohol, 2-aminodiphenyl, α- and β-naphthylamine, 1-aminoanthracene, benzidine, p-aminophenol, p-anisidine, 1-amino-2-naphthol, 4-aminoacetophenone, 2-aminobenzophenone, 2-aminoanthraquinone, anthranilic acid, p-aminosalicylic acid, furfurylamine, 2-aminothiophene and 2-aminothiazole.

Suitable Schiff's bases may also be prepared by the condensation of mixtures of the above mentioned oxo compounds with the mentioned amines.

Instead of the Schiff's bases or of the mixtures of primary amines and oxo compounds, there can also be used primary amines alone as starting materials for the reaction with the solutions of aldehyde-monoperacylates. In this case, the Schiff's bases are initially formed, due to the action of the aldehyde always present in excess in the solution of aldehyde-monoperacylate, which are then converted into the isonitrones.

Since the solutions of aldehyde-monoperacylate always contain a more or less large excess of aldehyde, it would be expected that, in the presence of primary amines, dark-colored resin-like condensation products, which are usually observed in the condensation of aldehydes with primary amines, would be formed. Surprisingly, however, in the new process this general side reaction does not take place. Even the isonitrones, when once formed, do not react with the excess aldehyde. As a result of this, yields can be obtained by this method which are considerably greater than those which are obtained by the known processes.

Suitable aldehyde monoperacylates are, for example, acetaldehyde-monoperacetate, propionaldehyde-monoperpropionate, butyraldehyde-monoperbutyrate and iso-butyraldehyde-monoperisobutyrate.

Suitable inert solvents which may optionally be used are, for example, benzine, ether, methylene chloride, chloroform, carbon tetrachloride, benzene and toluene.

The following examples are given for the purpose of illustrating the invention:

*Example 1*

Into 272 grams acetaldehyde, to which has been added 0.027 gram cobalt acetate, oxygen is passed through a sintered glass diffusion disc with stirring at −5° C. during the course of five hours. The determination of the active oxygen or peroxide content of the solution is carried out iodometrically in glacial acetic acid. 307 grams of a 40 percent solution of acetaldehyde-monoperacetate in acetaldehyde are thus obtained. 105 grams cyclohexylamine are slowly added to this solution at −5 to 0° C. The acetaldehyde is distilled off under a water pump vacuum, the residue shaken up with water, after having been diluted with ether, and subsequently neutralized with 30 percent potassium carbonate solution. By distillation of the solution, 118 grams methyl-N-cyclohexyl-isonitrone with a boiling point of 73–78° C./14 mm. Hg are obtained. The yield is 79 percent of the theoretical, based upon the active oxygen.

*Example 2*

Into 237 grams butyraldehyde, to which has been added 23 milligrams cobalt acetate, oxygen is passed through a sintered glass diffusion disc with stirring at −5° C. over a period of six hours. 262 grams of a 32 percent solution of butyraldehyde-monoperbutyrate in butyraldehyde are obtained. 45 grams cyclohexylamine are slowly added to the solution at −5° to 0° C. After half-an-hour, the reaction mixture, which is diluted with ether, is neutralized with potassium carbonate solution and then dried over potassium carbonate. By distillation of the solution, 70 grams propyl-N-cyclohexyl-isonitrone with a boiling point of 66–70° C./0.2 mm. Hg are obtained. The yield is 91 percent of theory calculated upon the active oxygen.

We claim:

1. A process for the production of an isonitrone which comprises the addition of a primary amine to a solution of an aldehyde monoperacylate in an aldehyde maintained at a temperature below about 50° C., the said solution of the aldehyde monoperacylate in the aldehyde having been prepared by charging oxygen through the said aldehyde at a temperature not higher than about 0° C., in such proportions that the amount of primary amine that is added is not more than that stoichiometrically equivalent to the aldehyde peracylate that is present in the solution, thereby avoiding the formation in the reaction mixture of quantities of the Schiff's base in excess of that quantity that is convertible by the aldehyde peracylate to the isonitrone, and subsequently distilling off the excess aldehyde from the reaction mixture at a subatmospheric pressure, and recovering the resulting isonitrone.

2. A process as defined in claim 1, in which the reaction mixture containing the primary amine and the aldehyde monoperacylate in solution in the aldehyde is carried out at a temperature within the range between about −10 and about +20° C.

References Cited in the file of this patent

UNITED STATES PATENTS

| | | |
|---|---|---|
| 2,784,182 | Krimm et al. | Mar. 5, 1957 |
| 2,785,185 | Phillips et al. | Mar. 12, 1957 |

FOREIGN PATENTS

| | | |
|---|---|---|
| 743,940 | Great Britain | Jan. 25, 1956 |

OTHER REFERENCES

Phillips et al.: Journ. Am. Chem. Soc., vol. 79, pp. 5982–86 (1957).